D. F. CURTIN.
SANITARY SPOON.
APPLICATION FILED FEB. 15, 1916.
1,323,619.                                                  Patented Dec. 2, 1919.
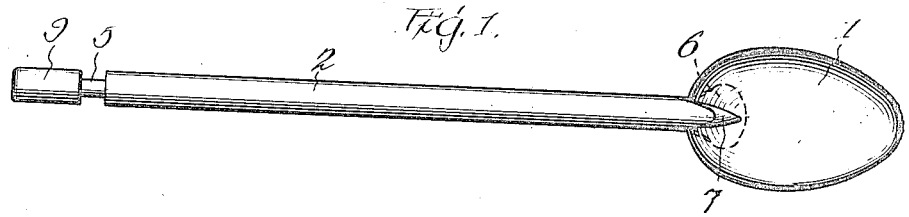
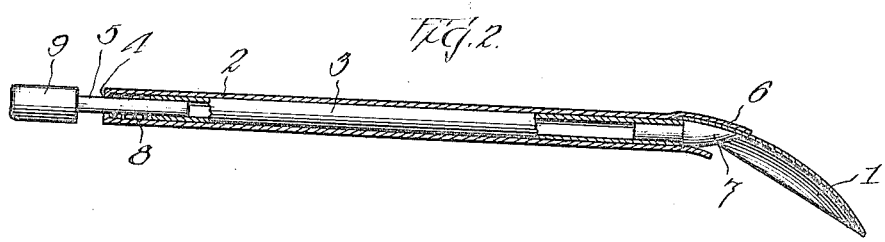
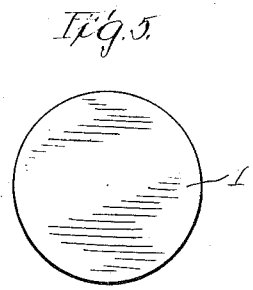
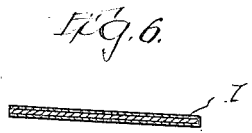

UNITED STATES PATENT OFFICE.

DAVID F. CURTIN, OF CHICAGO, ILLINOIS.

SANITARY SPOON.

1,323,619.

Specification of Letters Patent. Patented Dec. 2, 1919.

Application filed February 15, 1916. Serial No. 78,398.

*To all whom it may concern:*

Be it known that I, DAVID F. CURTIN, a citizen of the United States, residing at Chicago, in the county of Cook and State of Illinois, have invented certain new and useful Improvements in Sanitary Spoons, of which the following is a description.

My invention relates to the general class of utensils known as spoons and especially to the class of spoons used at soda fountains or other public refreshment stands.

The object of my invention is to provide a simple, convenient, cheap and serviceable device of the kind described wherein after the spoon has been in service, the bowl piece may readily be detached from the handle and a new bowl piece substituted without handling the bowl piece.

To this end my invention consists in the novel construction, arrangement and combination of parts herein shown and described and more particularly pointed out in the claims.

In the accompanying drawings wherein like or similar reference characters indicate like or corresponding parts:

Figure 1 is a plan view of my improved spoon.

Fig. 2 is a central longitudinal section of the same.

Fig. 3 is a bowl piece similar in form to the bowl piece of an ordinary spoon.

Fig. 4 is an edge elevation of the bowl piece shown in Fig. 3.

Fig. 5 is a circular disk shaped bowl piece which may also be advantageously employed.

Fig. 6 is an edge elevation of the part shown in Fig. 5.

In the form shown my improvement consists of a bowl piece 1 of the usual or any desired shape preferably formed of suitably prepared paper or other suitable material such for example as a comparatively heavy hard rolled paper coated on one or both sides with paraffin or other suitable material to adapt the spoon for use with the material it is designed to handle.

The handle part 2 may be of any suitable material and of any desired form or construction adapted to be rigidly attached to the bowl piece 1 to rigidly hold the same in position when in service. In the form shown a tubular handle 2 is provided of substantially uniform cross section. A part 3 is positioned within the handle 2 and extends longitudinally therethrough with a part projecting at each end of the handle. Suitable means are provided for permitting a limited longitudinal movement of the member 3 in the handle. As shown the member 3 is slightly reduced in diameter near one end, as at 5, so as to project beyond the shoulder 4 at the outer end of the handle. The opposite end of the handle 2 is provided with a part 6 formed to accurately correspond in shape with the desired form of the adjacent portion of the bowl piece 1 and the end 7 of the member 3 is formed to accurately coöperate with the part 6 of the handle so that when the member 3 is advanced toward the part 6 it will operate as a clasp to rigidly engage the bowl piece 1 and force the same into contact with the part 6 thus curving or crimping the edge of the bowl piece and accurately forming the adjacent portions of the same to correspond with the inner surface of the part 6.

In the preferred construction the bowl piece 1 is substantially flat and where thus formed the coöperation of the parts 6 and 7 will crimp the edge of the bowl piece thus dishing the same to form a shallow receptacle similar to the ordinary spoon bowl.

In the form shown a spring or other convenient resilient means is positioned in the handle 2 arranged to coöperate with the shoulder 4 and adjacent portion of the part 3 to normally hold the part 3 in engaging position and prevent its accidental disengagement from the bowl piece.

In the form shown a knob or handle 9 is rigidly attached to the part 5 of the member 3 for manually operating the same. When in service the part 3 is retracted from the part 6 thus opening the clasp after which the handle is positioned with its center line in alinement with the center line of the bowl piece 1 and the part 6 in suitable contact with the bowl piece. When in this position the member 3 is thrust toward the part 6 thus closing the clasp and engaging and dishing the bowl piece when my improved spoon is ready for use. In Fig. 4 a substantially flat disk shaped bowl piece is shown, forming when suitably engaged with the handle, a spoon especially adapted for use at soda fountains or other places where a substantially circular bowl piece is desirable.

Having thus described my improvement it is obvious that various immaterial modifications may be made in my device without de- parting from the spirit of my invention; hence I do not wish to be understood as limiting myself to the exact form or construction shown.

What I claim as new and desire to secure by Letters Patent is:

1. A spoon comprising a substantially flat bowl piece formed of suitable material, in combination with a handle having a dished extension at one end thereof and means shiftable upon said handle coöperating with said dished extension to engage and crimp the margin of said bowl piece to dish the same and rigidly attach said handle to said dished bowl piece.

2. A spoon comprising a bowl piece, in combination with a handle having a dished retaining lip at one end thereof, and a movable means associated with said handle coöperating with said lip to rigidly hold the bowl piece in attached position upon said handle.

3. A spoon comprising a substantially flat bowl piece, in combination with a handle having a concaved retaining lip at one end thereof, and a movable means associated with said handle coöperating with said lip to dish said bowl piece and rigidly attach the same to said handle.

4. A spoon comprising a bowl piece, in combination with a tubular handle having a dished retaining lip at one end thereof, and movable means arranged within said handle coöperating with said lip to rigidly hold the bowl piece in attached position upon said handle.

5. A spoon comprising a bowl piece, in combination with a handle having a concaved extension at one end thereof, and movable means associated with said handle coöperating with said extension to rigidly hold the bowl piece in attached position upon said handle.

6. A spoon comprising a flexible bowl piece, in combination with a handle having a concaved extension at one end thereof, and a movable member associated with said handle coöperating with said extension to dish said bowl piece and rigidly hold the same in attached position upon said handle.

7. A spoon comprising a bowl piece, in combination with a handle having a concaved retaining lip at one end thereof, and movable means associated with said handle coöperating with said concaved lip to dish said bowl piece and rigidly attach the same to the handle.

8. A spoon comprising a bowl piece, in combination with a handle having a curved retaining lip at one end thereof, and movable means associated with said handle coöperating with said curved lip to dish said bowl piece and rigidly attach the same to the handle.

9. A spoon comprising a flexible bowl piece, in combination with a handle having a concaved extension at one end thereof, and a shaping and retaining means movably associated with said handle coöperating with said extension to dish said bowl piece and rigidly attach the same to the handle.

10. A spoon comprising a substantially flat bowl piece formed of flexible material, in combination with a handle having a concaved extension at one end thereof, and movable means upon said handle adapted to coöperate with said extension to engage and crimp the margin of said bowl piece to dish and rigidly attach the same to the handle.

11. A spoon comprising a bowl piece in combination with a tubular handle having a concaved extension at one end thereof, a movable plunger arranged within said handle and provided at one end with a convexed head adapted to coöperate with said concaved extension to engage and crimp the margin of said bowl piece to dish and rigidly attach the same to the handle.

12. A spoon comprising a bowl piece, in combination with a tubular handle having a concaved extension at one end thereof, a movable plunger arranged within said handle and provided at one end with a head adapted to coöperate with said extension to engage and crimp the margin of said bowl piece to dish and rigidly attach the same to the handle.

In testimony whereof: I have hereunto signed my name in the presence of two subscribing witnesses.

DAVID F. CURTIN.

Witnesses:
BURTON U. HILLS,
BLANCHE CHALMERS.